(12) United States Patent
Deschizeaux et al.

(10) Patent No.: US 10,338,254 B2
(45) Date of Patent: Jul. 2, 2019

(54) SYSTEMS AND METHODS FOR MULTI-VOLUME DIRECTIONAL DE-NOISING

(71) Applicant: CGG SERVICES SA, Massy (FR)

(72) Inventors: Bernard Deschizeaux, Aberdeen (GB); Charlotte Sanchis, Oslo (NO)

(73) Assignee: CGG SERVICES SAS, Massy (FR)

( * ) Notice: Subject to any disclaimer, the term of this patent is extended or adjusted under 35 U.S.C. 154(b) by 717 days.

(21) Appl. No.: 14/761,966

(22) PCT Filed: Jan. 22, 2014

(86) PCT No.: PCT/EP2014/051268
§ 371 (c)(1),
(2) Date: Jul. 20, 2015

(87) PCT Pub. No.: WO2014/114683
PCT Pub. Date: Jul. 31, 2014

(65) Prior Publication Data
US 2015/0316674 A1 Nov. 5, 2015

Related U.S. Application Data

(60) Provisional application No. 61/832,446, filed on Jun. 7, 2013, provisional application No. 61/755,115, filed on Jan. 22, 2013.

(51) Int. Cl.
*G01V 1/36* (2006.01)

(52) U.S. Cl.
CPC .......... *G01V 1/364* (2013.01); *G01V 2210/21* (2013.01); *G01V 2210/324* (2013.01); *G01V 2210/3246* (2013.01); *G01V 2210/3248* (2013.01); *G01V 2210/45* (2013.01); *G01V 2210/612* (2013.01); *G01V 2210/614* (2013.01)

(58) Field of Classification Search
CPC ...................................................... G01V 1/364
See application file for complete search history.

(56) References Cited

U.S. PATENT DOCUMENTS

| | | | |
|---|---|---|---|
| 6,625,083 B2 * | 9/2003 | Vandenbroucke | G01V 1/16 181/112 |
| 2010/0271904 A1 | 10/2010 | Moore et al. | |

FOREIGN PATENT DOCUMENTS

| | | |
|---|---|---|
| EP | 1 217 390 A1 | 6/2002 |

OTHER PUBLICATIONS

Caprioli et al., "Combination of multi-component streamer pressure and vertical particle velocity: theory and application to data," SEG Technical Program Expanded Abstracts, SEG 2012 Annual Meeting, Nov. 4-9, 2012, Las Vegas, NV, USA.

(Continued)

*Primary Examiner* — Yu-Hsi D Sun
(74) *Attorney, Agent, or Firm* — Patent Portfolio Builders PLLC

(57) ABSTRACT

Systems and methods are provided for directional de-noising on seismic data recorded byseismic receivers. A method includes: receiving a seismic dataset, wherein the seismic dataset includes a model dataset and an input dataset to filter; decomposing the model dataset into a plurality of model directions, identifying which of the model directions to keep; and mapping the input dataset along the identified model directions resulting in a filtered output.

17 Claims, 14 Drawing Sheets

(56) References Cited

OTHER PUBLICATIONS

Carlson et al., "Increased resolution and penetration from a towed duel-sensor streamer," First Break, Dec. 2007, vol. 25, No. 12.

Day et al., "Wavefield-separation methods for duel-sensor towed-streamer data," Geophysics, Mar.-Apr. 2013, pp. WA55-WA70, vol. 78, No. 2.

Dowle et al., "Solid streamer noise reduction principles," SEG Technical Program Expanded Abstracts, SEG/New Orleans 2006 Annual Meeting, Oct. 1-6, 2006, pp. 85-89, New Orleans, LA, USA.

Ji et al., "Robust Inversion Using Biweight Norm," SEG Technical Program Expanded Abstracts, SEG 2011 Annual Meeting, Sep. 18-23, 2011, pp. 2717-2721, San Antonio, TX, USA.

Jones et al., "Signal-to-Noise Ratio Enhancement in Multichannel Seismic Data Via the Karhunen-Loéve Transform," Geophysical Prospecting, Jan. 1987, pp. 12-32, vol. 35, No. 1.

Oropeza et al., "Simultaneous seismic data denoising and reconstruction via multichannel singular spectrum analysis," Geophysics, May-Jun. 2011, pp. V25-V32, vol. 76, No. 3.

Robertsson et al., "On the use of multicomponent streamer recordings for reconstruction of pressure wavefields in the crossline direction," Geophysics, Sep.-Oct. 2008, pp. A45-A49, vol. 73, No. 5.

Soubaras, "Prestack random and impulsive noise attenuation by f-x projection filtering," 1995 SEG Annual Meeting, Oct. 8-13, 1995, Houston, TX, USA.

Teigen et al., "Characterization of noise modes in multicomponent (4C) towed streamers," SEG Technical Program Expanded Abstracts 2012, SEG 2012, Annual Meeting, Nov. 4-9, 2012, Las Vegas, NV, USA.

Trickett et al., "Prestack Rank-Reduction-Based Noise Suppression," CSEG Recorder, Nov. 2009, vol. 34, No. 9.

Trickett et al., "Robust rank-reduction filtering for erratic noise," SEG Technical Program Expanded Abstracts, SEG 2012 Annual Meeting, Nov. 4-9, 2012, Las Vegas, NV, USA.

Whitcombe et al., "Frequency dependent, structurally conformable filtering," SEG Technical Program Expanded Abstracts 2008, SEG 2008 Annual Meeting, Nov. 9-14, 2008, pp. 2617-2621, Las Vegas, NV, USA.

International Search Report and Written Opinion dated Sep. 10, 2014 in related International Application No. PCT/EP2014/051268.

Invitation to Pay Additional Fees dated Jun. 25, 2014 in related International Application No. PCT/EP2014/051268.

* cited by examiner

SYSTEMS AND METHODS FOR MULTI-VOLUME DIRECTIONAL DE-NOISING

RELATED APPLICATIONS

The present application is the National Stage of International Application No. PCT/EP2014/051268, filed Jan. 22, 2014, which claims priority and benefit from U.S. Provisional Patent Application Ser. No. 61/755,115, filed Jan. 22, 2013, for "Multi Volume Directional De-Noising", the entire contents of which are expressly incorporated herein by reference, and from U.S. Provisional Patent Application Ser. No. 61/832,446, filed Jun. 7, 2013, for "Guided Denoising of Particle Motion Measurements Using Pressure Measurements for Multicomponents Towed Streamers Data", the entire contents of which are expressly incorporated herein by reference.

TECHNICAL FIELD

The embodiments relate generally to methods and systems and, more particularly, to mechanisms and techniques for more efficiently de-noising a data set.

BACKGROUND

A widely used technique for searching for hydrocarbons, e.g., oil and/or gas, is the seismic exploration of subsurface geophysical structures. Reflection seismology is a method of geophysical exploration to determine the properties of a portion of a subsurface layer in the earth, which information is especially helpful in the oil and gas industry. Marine-based seismic data acquisition and processing techniques are used to generate a profile (image) of a geophysical structure (subsurface) of the strata underlying the seafloor. This profile does not necessarily provide an accurate location for oil and gas reservoirs, but it may suggest, to those trained in the field, the presence or absence of oil and/or gas reservoirs. Thus, providing an improved image of the subsurface in a shorter period of time is an ongoing process.

The seismic exploration process includes generating seismic waves (i.e., sound waves) directed toward the subsurface area, gathering data on reflections of the generated seismic waves at interfaces between layers of the subsurface, and analyzing the data to generate a profile (image) of the geophysical structure, i.e., the layers of the investigated subsurface. This type of seismic exploration can be used both on the subsurface of land areas and for exploring the subsurface of the ocean floor.

Marine reflection seismology is based on the use of a controlled source that sends energy waves into the earth, by first generating the energy waves in or on the ocean. By measuring the time it takes for the reflections to come back to one or more receivers (usually very many, perhaps on the order of several hundreds, or even thousands), it is possible to estimate the depth and/or composition of the features causing such reflections. These features may be associated with subterranean hydrocarbon deposits.

Seismic waves are initiated by a source, follow one or more paths based on reflection and refraction until a portion of the seismic waves are detected by one or more receivers. Upon detection, data associated with the seismic waves is recorded and then processed for producing an accurate image of the subsurface. The processing can include various phases, e.g., velocity model determination, prestack, migration, poststack, etc., which are known in the art and thus their description is omitted here.

A traditional marine system for recording seismic waves is illustrated in FIG. 1, and this system is described in European Patent No. EP 1 217 390, the entire content of which is incorporated herein by reference. In this document, a plurality of seismic receivers 2 are each removably attached to a pedestal 4 together with a memory device 6. A plurality of such receivers is deployed on the bottom 8 of the ocean. A source vessel 10 tows a seismic source 12 that is configured to emit seismic wave 14. Seismic wave 14 propagates downward, toward the ocean bottom 8. After being reflected from a structure 16, the seismic wave (primary) is recorded (as a trace) by the seismic receiver 2.

Multi-component marine acquisition uses receivers that are capable of measuring a pressure wavefield and at least one component of a particle motion that is associated with acoustic signals. Examples of particle motions include one or more components of a particle displacement, one or more components of a particle velocity (for example, inline (X), crossline (Y) and vertical (Z) components) and one or more components of a particle acceleration.

Noise can come from a variety of sources which can affect the different components of the received seismic signals in different manners. In most cases the noise characteristic is different for each component in term of coherency, location or amplitude. As all components contain valuable information it is desirable to design efficient methods that de-noise each component independently and/or simultaneously. Standard de-noising techniques either rely on the noise being incoherent (f-x-deconvolution, projection filtering, etc.) or that the noise is distinguishable in some other way (e.g., Radon demultiple discrimination on moveout). Multi volume de-noising will use the coherency of the signal between components as a discriminator to de-noise the data.

Land reflection seismology involves deploying one or more seismic sources and seismic detectors at predetermined locations. The seismic sources generate pressure (seismic) waves, which propagate into the geological formations. Changes in acoustic properties of the geological formation scatter the seismic waves, changing their direction of propagation and other properties. Part of the energy emitted by the seismic sources is reflected inside the geological formation.

In a land data acquisition system, the detectors may be arranged along receiver lines, while the seismic sources are usually positioned at shot points in-between the receiver lines on shot lines parallel to the receiver lines as the land topography allows. The recorded seismic data corresponds to signals (due to seismic wave reflections inside the geological formation) and to overlapping noise. The seismic data includes values proportional to pressure versus time or to displacement versus time as sensed by seismic detectors (e.g., hydrophones and geophones), associated with the corresponding positions of the detectors and of the shot point.

De-noising techniques balance the efficiency of the de-noising and the preservation of the underlying signal. In practice it is often more important to protect the signal so that after processing, genuine information can be extracted. This can significantly reduce the de-noising efficiency. For that reason modern de-noising techniques try to differentiate signal and noise by including as many signal characteristics as possible such, as amplitude and directions, in order to discriminate the noise from the signal.

Accordingly, it would be desirable to provide methods and systems that avoid the afore-described problems and drawbacks.

SUMMARY

According to an embodiment there is a method for performing directional de-noising on seismic data recorded by seismic receivers, the method including: receiving a seismic dataset, wherein the seismic dataset includes a model dataset and an input dataset to filter; decomposing the model dataset into a plurality of model directions; identifying which of the model directions to keep; and mapping the input dataset along the identified model directions resulting in a filtered output.

According to an embodiment there is a method for performing directional de-noising on seismic data recorded by seismic receivers, the method including: receiving a seismic dataset, wherein the seismic dataset includes a model dataset and an input dataset to filter; merging the model dataset and the input dataset into a single dataset; mapping each frequency slice into a Hankel matrix of Hankel matrices; reducing the rank of the Hankel matrix; recovering the structure of a Hankel matrix; extracting the filtered frequency slice; and separating the input dataset from the model dataset resulting in a filtered output.

According to an embodiment there is a method for performing directional de-noising on seismic data recorded by seismic receivers, the method including: receiving a seismic dataset, wherein the seismic dataset includes a model dataset and an input dataset to filter; decomposing the model data into a plurality of directions and the input dataset into a plurality of directions; linking the model directions to the input dataset directions; identifying which of the model directions to keep based on an a priori knowledge or a multi-criteria selection; and determining which of the input data directions to keep using the link between the kept model directions and the corresponding input directions, resulting in a filtered output.

According to an embodiment there is a method for performing directional de-noising on seismic data recorded by seismic receivers, the method including: receiving a seismic dataset, wherein the seismic dataset includes a noise model dataset and an input dataset to filter; decomposing the noise model dataset into a plurality of model directions; identifying which of the noise model directions to keep; mapping the input dataset along the identified noise model directions resulting in an estimate of the noise; and subtracting the estimate of the noise from the input dataset resulting in a filtered output.

According to an embodiment there is a method for performing directional de-noising on seismic data recorded by seismic receivers, the method including: receiving a seismic dataset, wherein the seismic dataset includes a noise model dataset and an input dataset to filter; decomposing the noise model data into a plurality of directions and the input dataset into a plurality of directions; linking the noise model directions to the input dataset directions; identifying which of the noise model directions to keep based on an a priori knowledge or a multi-criteria selection; and determining which of the input data directions to keep using the link between the kept noise model directions and the corresponding input directions resulting in an estimate of the noise; and subtracting the estimate of the noise from the input dataset resulting in a filtered output.

According to another embodiment, there is a computer device configured to perform directional de-noising on seismic data recorded by seismic receivers, the computer device including: the computer device configured to receive a seismic dataset, wherein the seismic dataset includes a model dataset and an input dataset to filter; a processor configured to decompose the model dataset into a plurality of model directions; the processor configured to identify which of the model directions to keep; and the processor configured to map the input dataset along the identified model directions resulting in a filtered output.

BRIEF DESCRIPTION OF THE DRAWINGS

The accompanying drawings illustrate exemplary embodiments, wherein.

DETAILED DESCRIPTION

Figure 1:
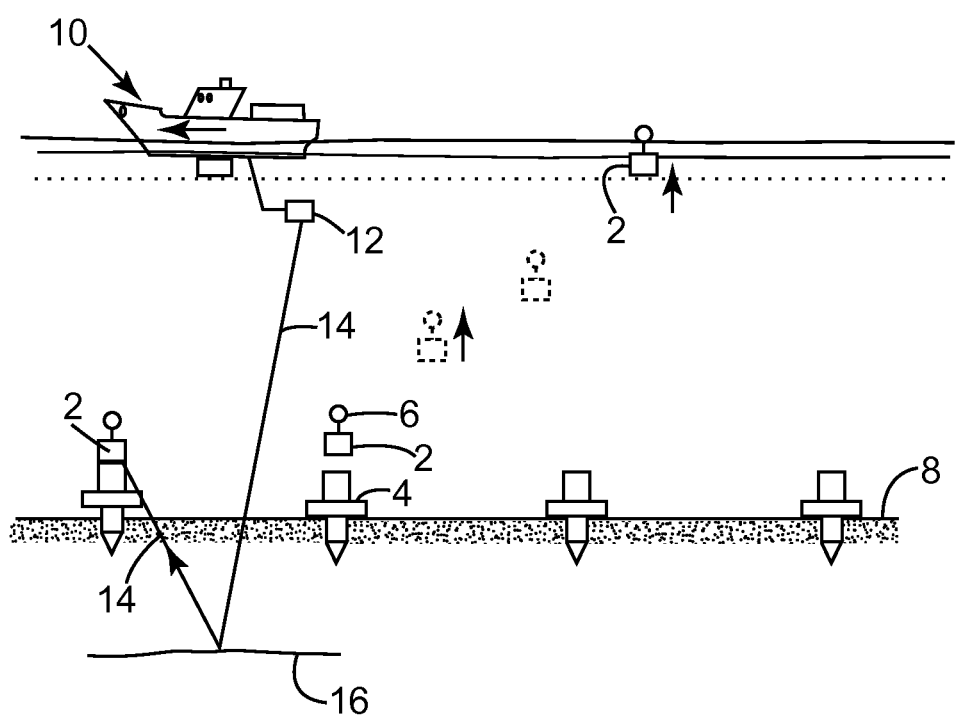
FIG. 1 illustrates a traditional marine system for recording seismic waves.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will be thorough and complete, and will fully convey the scope of the inventive concept to those skilled in the art. The scope of the embodiments is therefore defined by the appended claims. However, the embodiments to be discussed next are not limited to these systems but may be applied to other methods for de-noising received seismic signals.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

According to embodiments, directional de-noising can be performed for received seismic signals in both land and marine seismic operations in environments which have a relatively high level of noise. Prior to discussing embodiments in detail, an environment in which there is a variable and high level of noise is now described in more detail.

Figure 2:
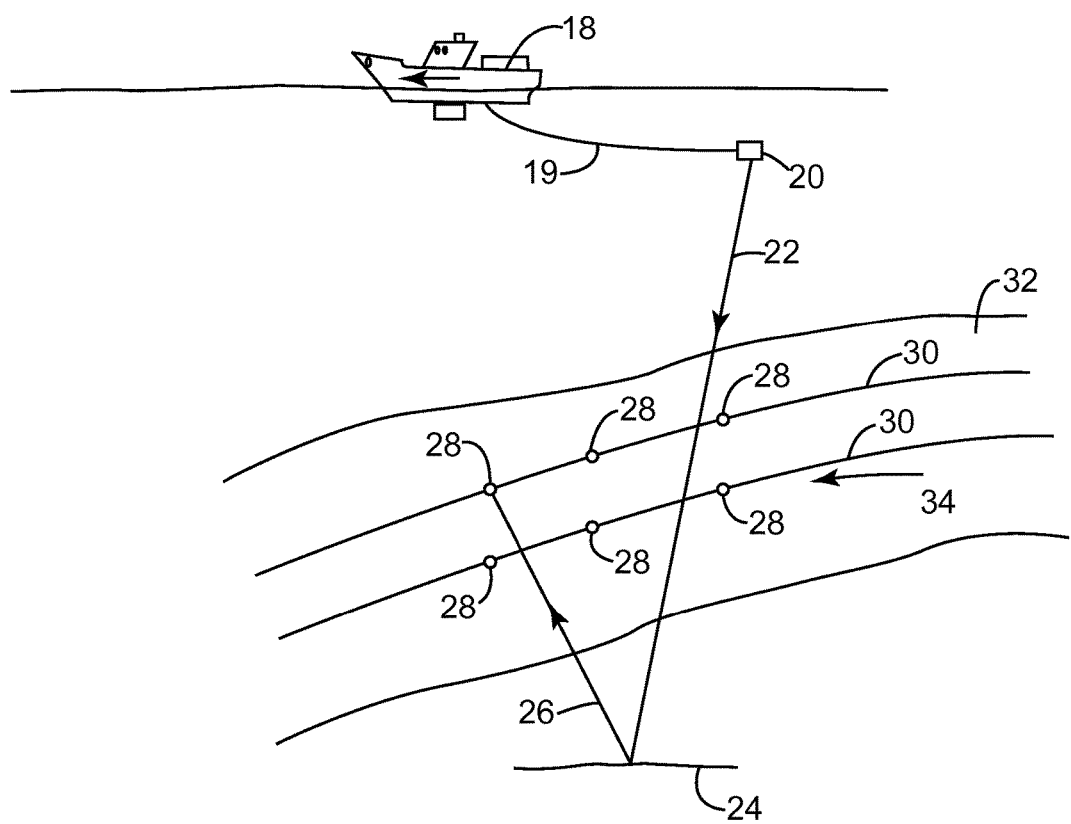
FIG. 2 depicts a ship towing a seismic source according to an embodiment.

According to an embodiment as shown in FIG. 2, there is a ship 18 towing a seismic source 20 which emits seismic waves (also known as seismic signals) depicted by seismic signal 22. The seismic source is attached to a cable 19. Seismic signal 22 reflects off of an interface 24, resulting in a reflected seismic signal 26 which is received by a receiver 28. The receiver 28 can include geophones (for obtaining a X, Y and Z components) and a hydrophone component (for obtaining a pressure P component). A plurality of receivers 28 can be attached to a cable 30, e.g., an Ocean Bottom Cable (OBC) system. These one or more cables 30 can rest on the seabed 32 which can have a varied surface. Additionally, there can be a tidal current, shown by arrow 34, which can affect the cables 30 and their associated receivers 28 as described in the Background.

Figure 3:
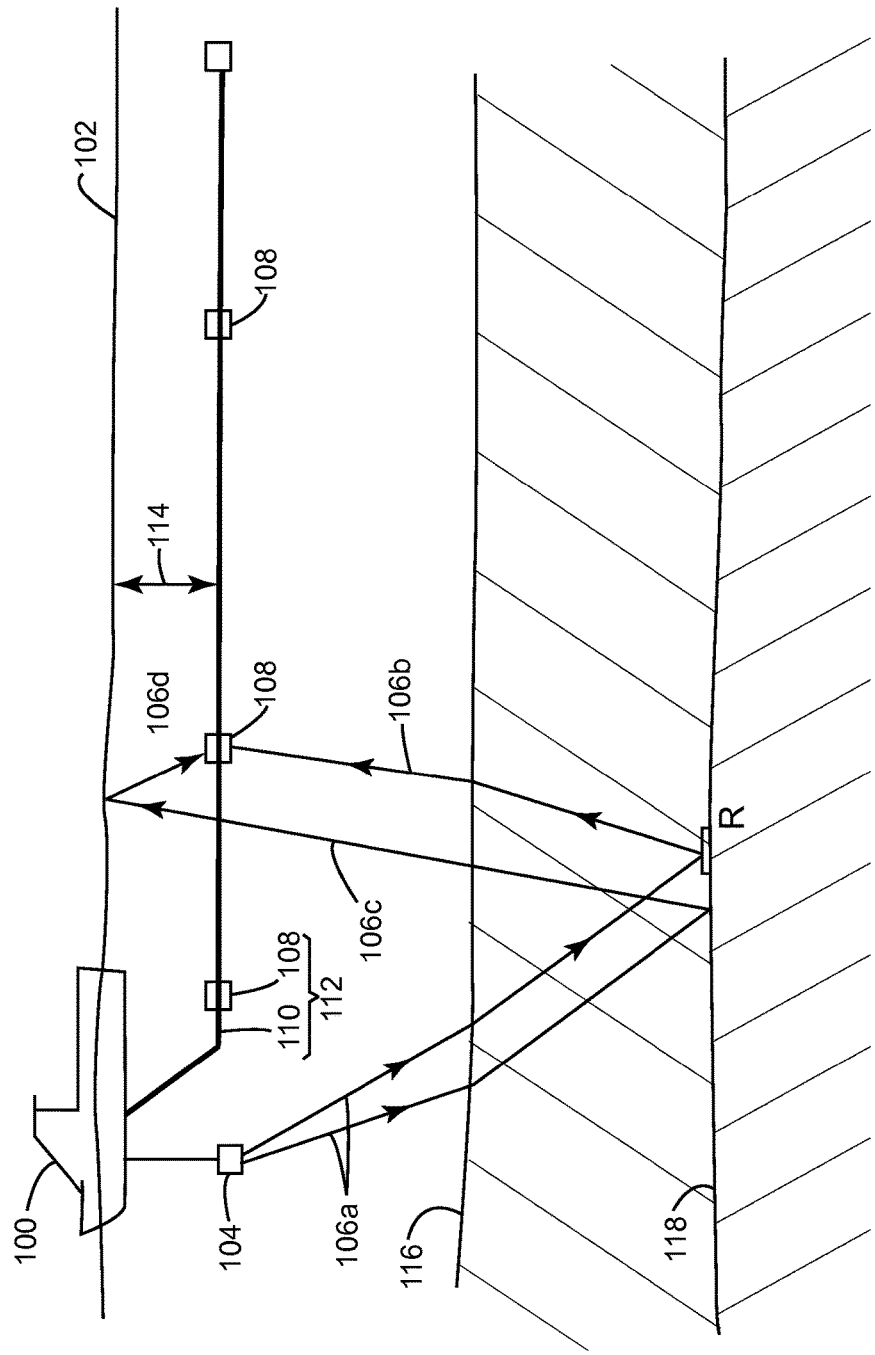
FIG. 3 depicts a ship towing a seismic source and a streamer according to an embodiment.

According to an embodiment, as shown in FIG. 3, there is a ship 100 towing a seismic source 104 which emits seismic waves (also known as seismic signals) depicted by seismic signal 106. The ship 100 drags an array of acoustic detectors 108 that are provided on cable 110; the detectors 108 and the cable 110 are known as a streamer 112; the ship 110 may drag a plurality of streamers 112. The streamers 112 may be horizontal, i.e. lying at a constant depth 114 relative to a surface 102 of the ocean, or slanted or have a curved profile. The ship 100 also drags a seismic source 104 that is configured to generate an acoustic wave 106a. The acoustic wave 106a propagates downwards toward the seafloor, and penetrates the seafloor until eventually a reflector (R), on a layer interface 118, reflects the acoustic wave. The reflected acoustic wave 106b propagates upwardly until it is detected by detector 108.

Another reflected acoustic wave 106c propagates upwardly to the surface 102 and is then reflected back, 106d, to be detected by detector 108. The recorded data related to the detected waves is then processed for producing an accurate image of the subsurface. The processing includes various phases, e.g. conventional de-noising techniques, velocity model determination, migration, etc., which are known in the art and thus, their description is omitted herein.

Figure 4:
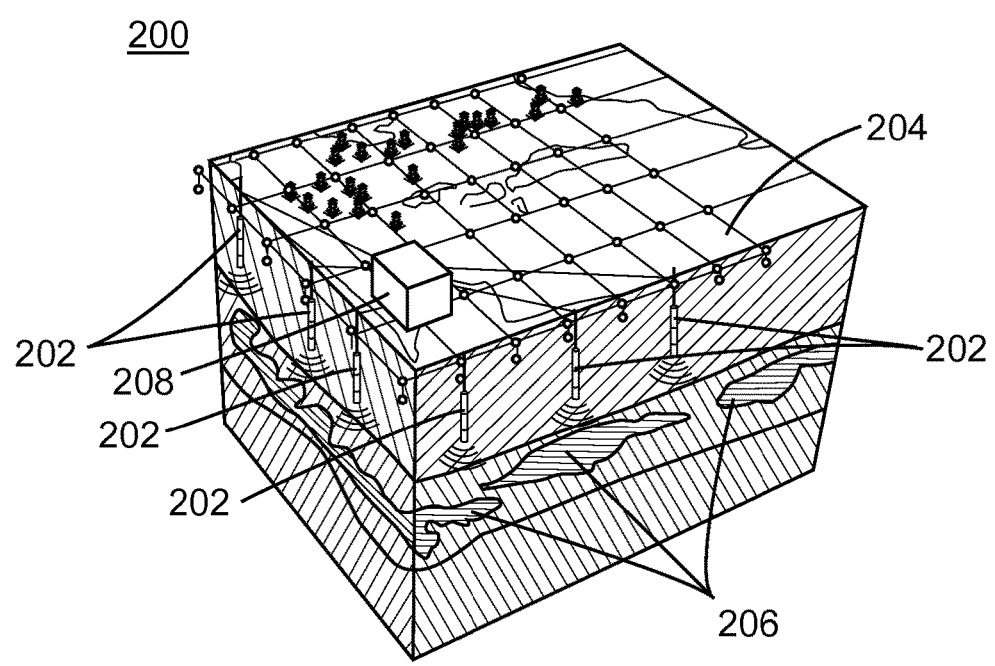
FIG. 4 shows a schematic diagram of a land seismic survey system according to an embodiment.

According to an embodiment, as shown in FIG. 4, a land seismic survey system 200 includes one or more sources 202 configured to generate seismic waves in the rock formation 206 and a grid of detectors 204 connected to a data processing unit 208. The grid of detectors 202 is often regular (i.e., the detectors are arranged at regular intervals along orthogonal directions), but may be arranged irregularly, and individual detectors may be located at different elevations from one another. While the detectors 204 are frequently kept at known positions for long periods, one or more seismic sources 206 may be relocated in different positions.

According to an embodiment, there is a method for de-noising data according to a de-noising algorithm. According to an embodiment, a direction on a desired model dataset, herein called a "model" dataset (for example, a pressure P dataset, a synthetic model dataset, a strongly de-noised dataset or a dataset resulting from previously processed data as found in a four dimension (4D) application), can be used to select the direction in a noisy dataset, herein called an "input" dataset. Local data typically has only one main direction layer. Alternatively, local data can also include a main direction layer and a few other direction layers that may be desirable to keep, e.g., nonlinear events and diffractions. It is assumed that all other directions are noise. The de-noising method can be applied to any type of seismic data that can be obtained for example from an Ocean Bottom Cable (OBC) system, from a marine towed streamer acquisition system or from a land acquisition system.

According to an embodiment, this algorithm provides useful results for random noise attenuation. With respect to coherent noise, the algorithm is more efficient when the signal and the noise have very different amplitudes. For example, when the noise has a larger amplitude than the signal, the first few directions with the larger eigen-value can be removed. When the noise has a smaller amplitude than the signal, the directions with a small eigen-value can be removed. For the case when the signal and the noise have comparable energy values, more information is needed to select the correct direction. According to an embodiment, one or more iterations of de-noising using an algorithm can occur depending on, for example, the level of noise. Other factors or elements which can be considered include a desire to apply the filtering in a different domain or to use a different model successively to remove a different type of noise.

According to an embodiment, there is a method for de-noising, described herein as "directional de-noising", the noise from the receivers, including the heavily contaminated receivers, using a joint process which uses the model data as a model to drive an algorithm that preserves the signal of the input data, while de-noising the input data. The algorithm, according to an embodiment, works by providing an input data and a model, which is then decomposed into their main directions using a rank reduction method. The rank reduction step can be achieved in numerous ways, e.g., truncated singular value decomposition (SVD), robust rank reduction filtering, eigenimage analysis, or some combination thereof. Directions in the data volume are compared to the ones provided by the model to decide which one needs to be kept and which one needs to be attenuated.

Figure 5:
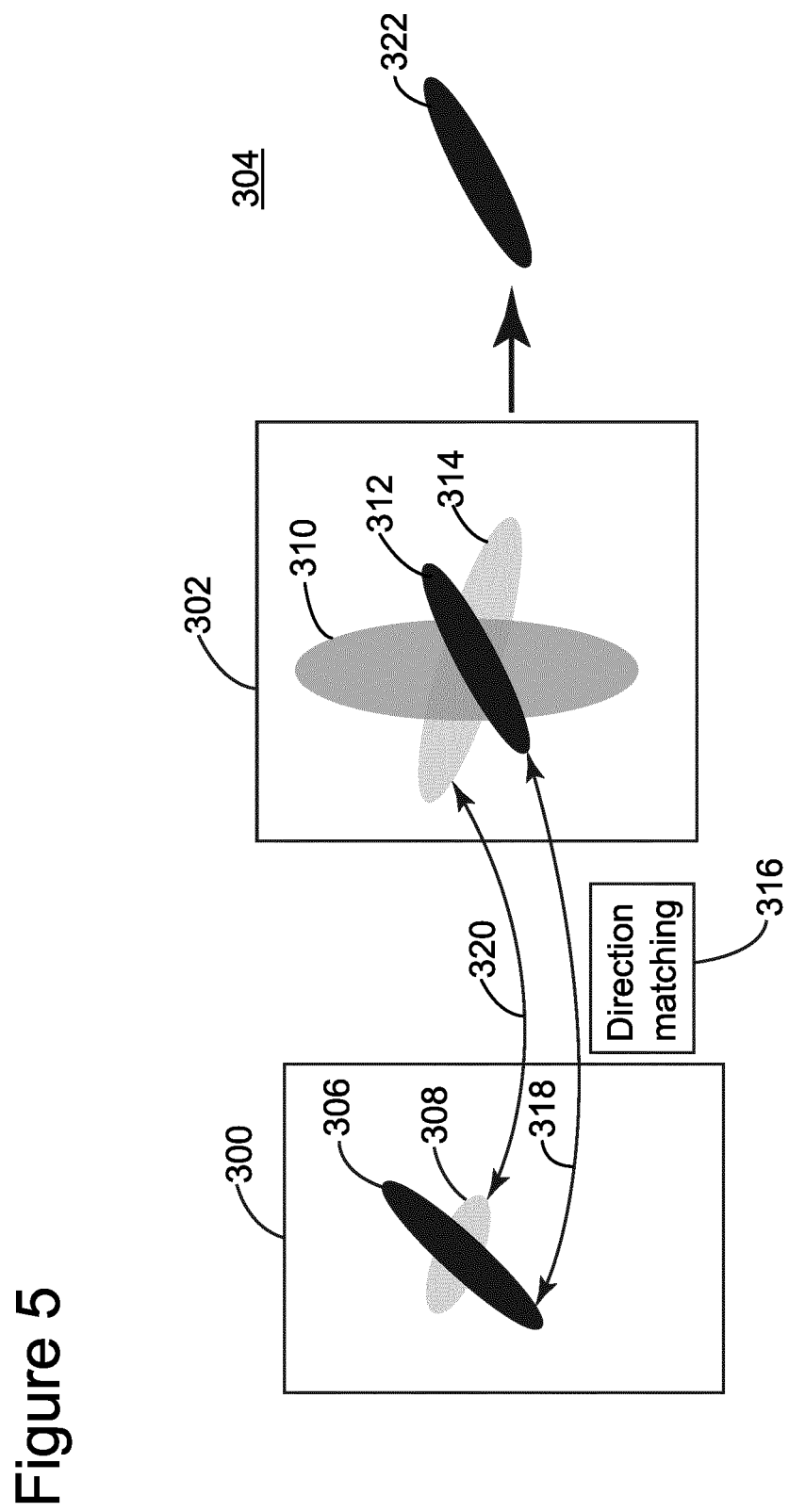
FIG. 5 depicts decomposing and matching the direction of two datasets according to an embodiment.

According to an embodiment, this can be seen graphically in FIG. 5 which illustrates decomposing and matching the direction of each dataset to select the direction(s) that it is desirable to keep. For example, FIG. 5 shows a model data 300 decomposed into two schematic directions with 306 being the signal direction and 308 being the noise direction. An input data set 302 is decomposed into three schematic directions with 312 being a signal direction, 310 and 314 being some noise directions. The direction matching process 316 is represented as two links 318 and 320 which match the direction 306 with 312 and direction 308 with 314, respectively.

The direction 306 in the model data being identified as the one direction to preserve, and link 318 identifies the direction 312 in the input data 302 to preserve. Direction 312 from the input data 302 will be the only preserved direction 322, in this example, in the filtered data 304.

According to an embodiment, the model data and the input data can be decomposed into their principal directions using rank reduction, for example SVD. Then the model directions can be linked with the input directions using multi-variable criteria. The model directions to be kept are then identified. The input directions to be kept are then defined using, possibly among other criteria, the link to the kept model directions. This process allows minimization of noise leakage going through the filter without, or minimally, harming the signal of the input data. However, access to reliable directional information when the data range from noisy to extremely noisy may be desirable for this process to work, wherein the noisier the data is, typically the more difficult it is to remove the noise which can result in subsequent filtering passes. Optionally, according to an embodiment, using the RMS of the amplitude can allow for identification of the noisier (or noisiest) traces and using a weighting factor based on the RMS of the amplitude can allow the direction estimation to be relatively stable even in worst cases.

According to an embodiment, the algorithm can use two or more cascaded passes. Alternatively, one or more cascaded passes can be used by the algorithm. Between the passes, the data can be rearranged in an opposing direction in order for the singular value decomposition to see the data in a different way and thereby manage to remove part of the noise which was previously hidden behind the direction of the signal.

Figure 6:
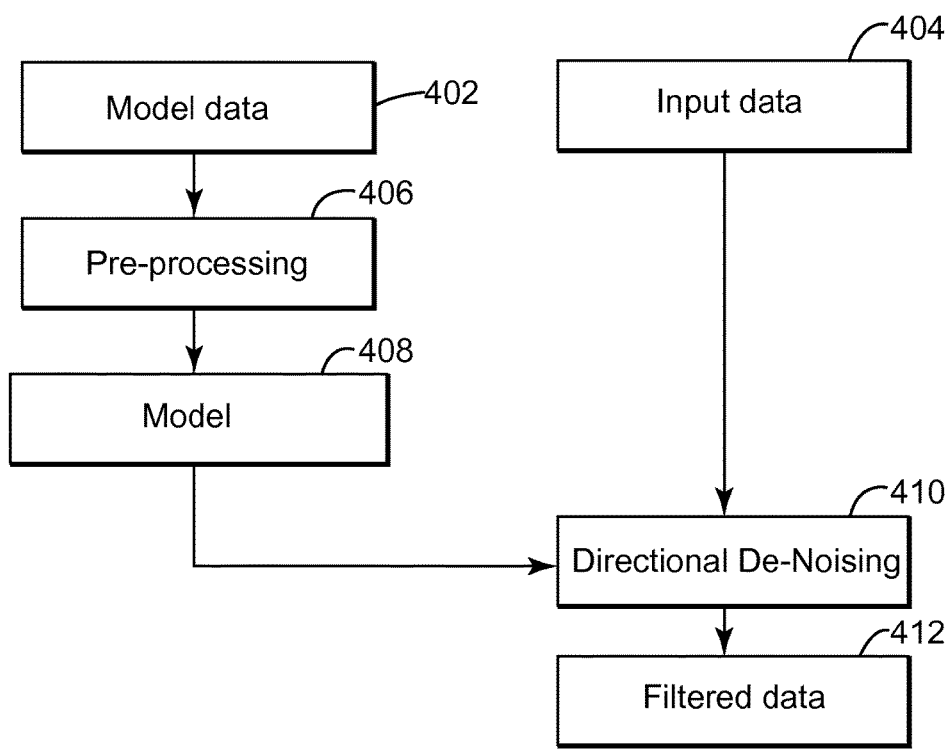
FIG. 6 illustrates a method for performing directional de-noising of seismic data according to an embodiment.

FIG. 6 shows a directional de-noising sequence 400 which begins with the inputs of model data 402 and input data 404. The model data 402 undergoes a pre-processing sequence that may include strong de-noising process 410 prior to being formatted into a model 408. Both the model data 402 and the input data 404 are used in the directional de-noising 410 to produce the filtered data 412.

Figure 7:
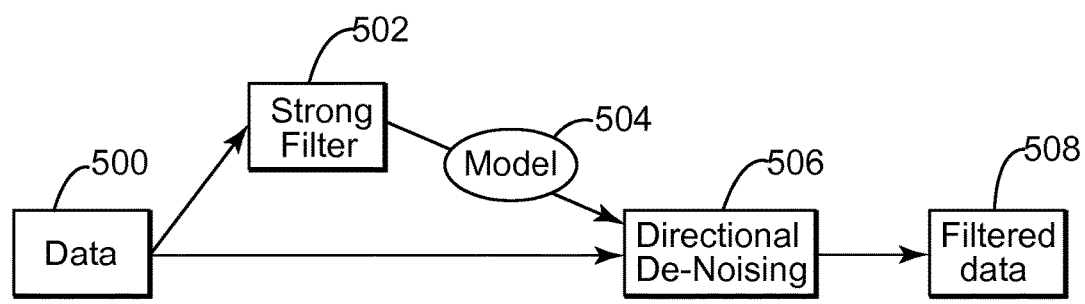
FIG. 7 illustrates one volume filtering according to an embodiment.

According to another embodiment, one volume filtering, in some cases, can be used for de-noising data as shown in FIG. 7. For this case strong filtering 502 can be used on a noisy data set 500 where strong filtering generally means removing almost completely the noise component while possibly damaging the signal. This strong de-noising can be used in this case as the generated model is used for determining the direction(s) to preserve. The output results in a model 504, but also with a damaged signal. Thus the model 504 is used for directional de-noising on the noisy data set 500 to perform directional de-noising 506 as described above. This then results in a filtered data set 508 with an acceptable noise and signal level, i.e., the filtered data 508 may be almost as clean (or uncontaminated) as the model 504, but without damaging the signal.

According to an embodiment, there is a method for de-noising operating in the frequency-offset domain, the noise from the receivers, including the heavily contaminated receivers, using a joint process which uses the model data as a model to drive an algorithm that preserves the signal of the input data, while de-noising the input data. The algorithm, according to an embodiment, works by providing an input data and a model, which is then decomposed into their main directions using a rank reduction-based method that can be for example singular value decomposition (SVD). Directions in the model are then mapped to the data volume to estimate the signal of the input data.

A rank reduction-based method operating in the frequency-offset domain can be for example a Cadzow filter. A Cadzow filter operates in constant frequency slices. In one dimension (1D), a frequency-offset f-x Cadzow filter embeds each frequency slice into a Hankel matrix. However, Cadzow filtering can be extended to any number of spatial dimensions, e.g., two dimensions which can be performed by forming a Hankel matrix of Hankel matrices or three dimensions which can be performed by forming a Hankel matrix of Hankel matrices of Hankel matrices.

The frequency-offset Cadzow embeds each frequency slice into a Hankel matrix. The rank of this matrix can be equal to the number of distinct dips in the data. Additive incoherent noise in the data will increase the rank of the Hankel matrix. Thus, the noise attenuation problem can be posed as a matrix rank-reduction problem. The anti-diagonal elements of the rank reduced matrix can then be averaged to recover the signal in the f-x domain and then transformed back to the time-offset, t-x, domain. The rank reduction step can be achieved in numerous ways, e.g., truncated SVD, robust rank reduction filtering, eigenimage analysis, or some combination thereof.

According to an embodiment, a rank reduction-based method operating in the frequency-space domain such as for example Cadzow filtering can be extended to use the directions of model data to guide the noise attenuation of the input data, i.e. the data to be de-noised. Embodiments described below can be applied to most any type of data including both data containing surface related ghosts and deghosted data. As the concepts of ghosts and deghosting of data are known in the art of seismic data processing, no further explanation is provided herein for purposes of brevity and simplicity.

Figure 8:
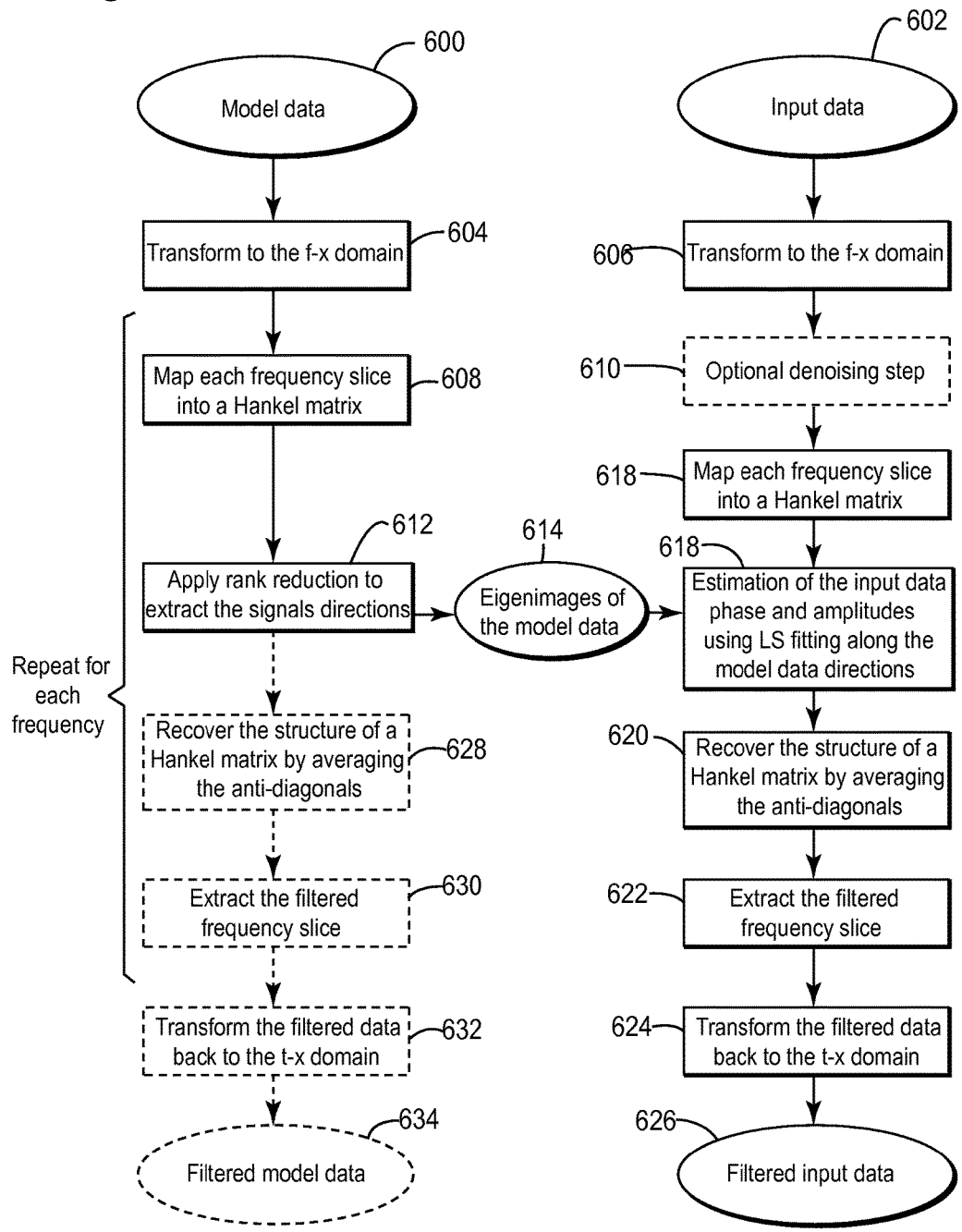
FIG. 8 shows another method for directional de-noising according to an embodiment.
Figure 9:
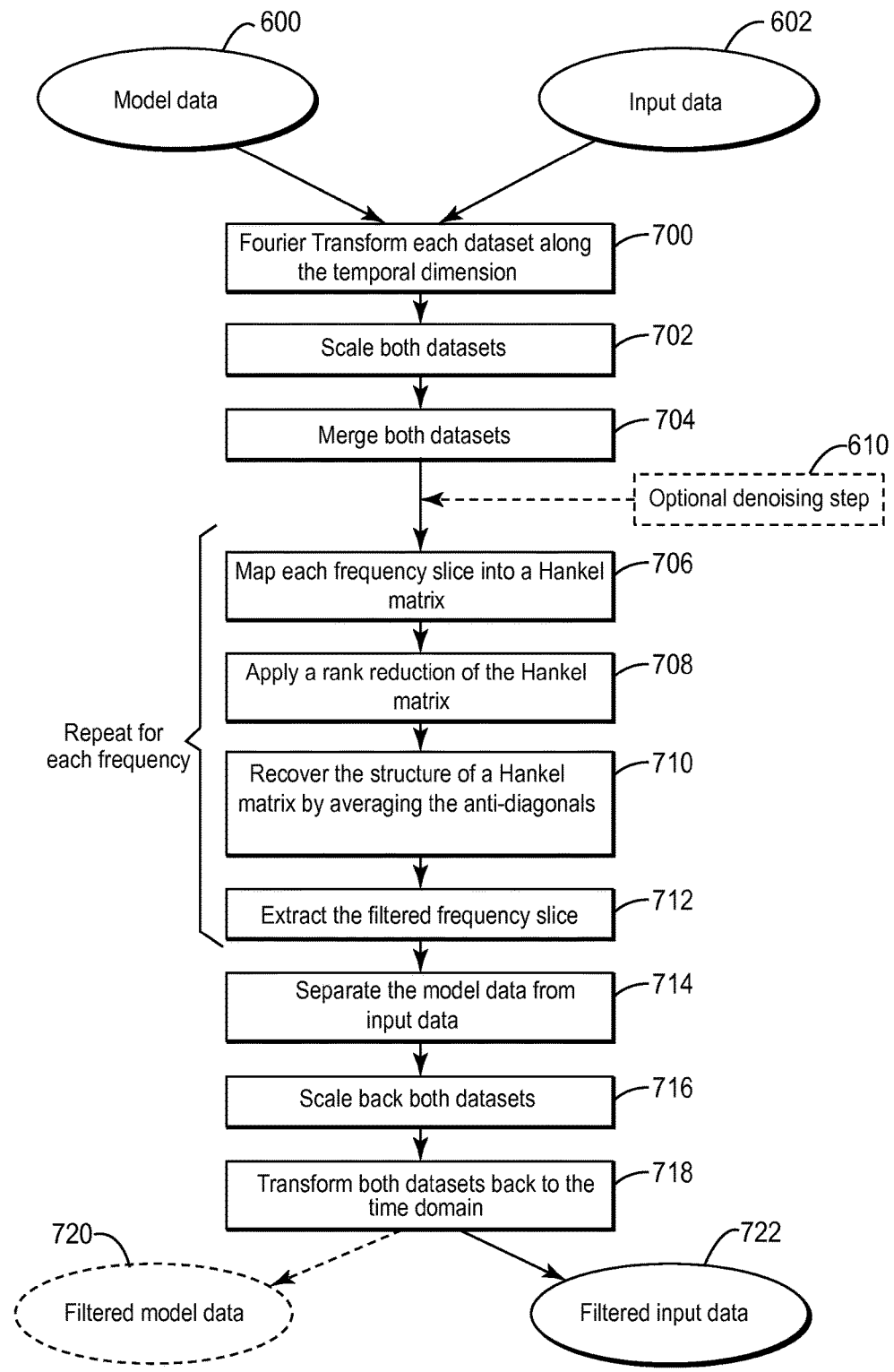
FIG. 9 illustrates another method for directional de-noising according to an embodiment.

According to an embodiment, as shown in FIG. 8, there is a method for directional de-noising which includes two transformation steps (and other sub-steps) as follows. In FIGS. 8-9, dashed lines represent optional steps. At steps 604 and 606, the method operates by transforming each of the model dataset 600 and the input dataset 602, to the frequency-space domain and, for each frequency, performing the following sub-steps. At sub-step 610 the method operates by applying an initial standard noise attenuation step that targets coherent noise. Sub-step 610 is an optional step and can be, for example, an f-x prediction filter or a time-frequency de-noising filter.

Continuing on with the model data path, at sub-step 608, the method operates by mapping the model data frequency slice into a Hankel matrix (which can be considered as a Hankel matrix in its 1D configuration), and applying a rank-reduction method that extracts the signal's directions at sub-step 612. Additionally, sub-step 628 can optionally include recovering the Hankel structure by averaging the anti-diagonal and extracting the model data filtered frequency slice at sub-step 614. At step 612, the method operates by applying a rank reduction to extract the signals directions which leads to eigenimages 614 of the model data. Returning now to the input data path, after the optional de-noising step 610, at step 616 the method operates by mapping the input data frequency slice into a Hankel matrix. This is then followed by, at step 618, estimating the input data phases and amplitudes using least squares fitting along the model data directions, and this way, reducing the rank of the Hankel matrix of input data. At step 620 recovering the Hankel structure by averaging the anti-diagonal and then at step 622 extracting the particle motion data filtered frequency slice. Then, at step 624, the method operates by transforming the filtered input dataset back to the time-space domain resulting in filtered data 626. According to an embodiment, this method can also be used to de-noise more than one input data sets, e.g., Z and Y geophone components, using a model data set.

According to an embodiment, the method described with respect to FIG. 8 can further include optional steps associated with the model data path as follows: at step 628, recovering the Hankel structure by averaging the anti-diagonal and then at step 630 extracting the filtered frequency slice. Then, at step 632, transforming the model dataset back to the time-offset domain resulting in filtered model data 634.

According to an embodiment, there is another method for directional de-noising as shown in FIG. 9 which uses a two or more dimensional mapping to Hankel matrix. Model data 600 and input data 602, after separately undergoing the steps of Fourier transform along the temporal dimension at step 700, and scaling each data set in step 702, are then merged at step 704. These merged datasets are mapped into a Hankel matrix at step 706. For example, in the case where the input dataset contains only one dataset, then a 2D mapping is required and the merged data are mapped into a Hankel matrix of Hankel matrices, instead of a Hankel matrix in its 1D configuration as described above with respect to FIG. 8. For example, in the case where the input dataset contains two datasets (for example, the Y and Z components), then a 3D mapping is required and the merged data are mapped into a Hankel matrix of Hankel matrices of Hankel matrices.

The steps of rank reduction 708, recovery of the Hankel structure 710 and extraction of the filtered frequency slice 712 are unchanged as described with respect to FIG. 8 (even though the step numbers are different). After extraction of the filtered frequency slice at step 712, the model data values are separated from the input data values at step 714. At step 716, both datasets are scaled back and at step 718 both data sets are transformed back into the time domain. This results in a filtered model data 720 and a filtered input data 722. The optional noise attenuation step 610 can also be added to the de-noising flow. Other steps as shown in FIG. 8 can be modified as desired in support of using the multidimensional directional de-noising filter.

Figure 10:
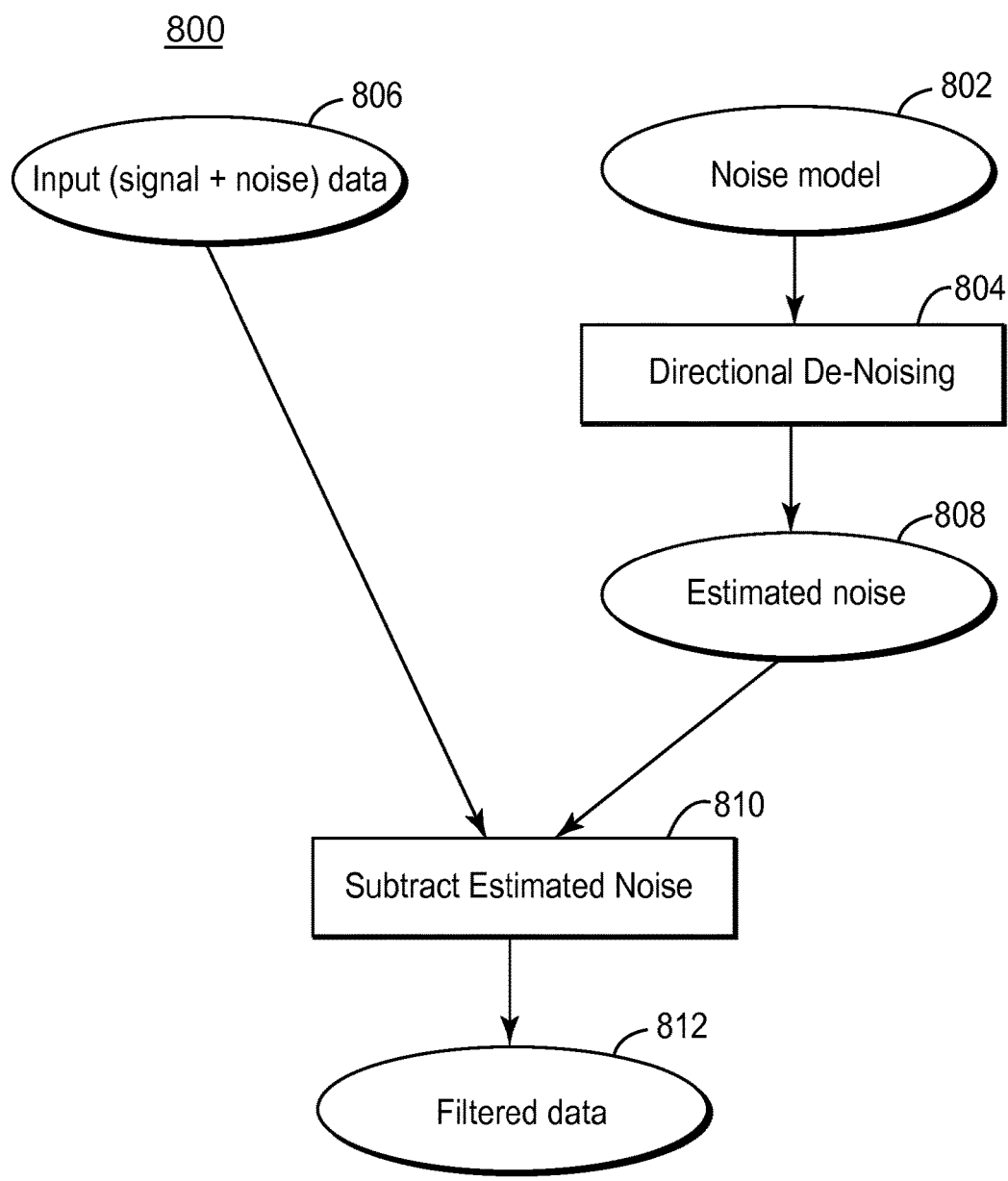
FIG. 10 shows another method for directional de-noising according to an embodiment.

According to an embodiment, as shown in FIG. 10, there is a method for de-noising data according to a de-noising algorithm 800 where a noise model 802 is used as a "model" dataset and one or more directions on a noise model dataset can be used to select the directions of the noise in any dataset here called "input" dataset 806. The noise model 802 undergoes a directional de-noising step 804 which generates an output of an estimate 808 of the noise in the input dataset. The estimate of the noise model 808 is then subtracted from the input dataset as shown by block 810 to generate an output of the filtered data 812 in which the targeted noise has been attenuated. The noise model dataset 802 can be, for example, a synthetic model resulting from finite-difference modelisation, an estimate of certain types of noise (for example, noise estimate resulting from interferometry, multiples estimate resulting from surface related multiple elimination technique), or a noise estimation resulting from the difference between an input dataset and a cleaner dataset. The de-noising method can be applied to any type of seismic data that can be obtained for example from an Ocean Bottom Cable (OBC) system, from a marine towed streamer acquisition system or from a land acquisition system.

Figure 11:
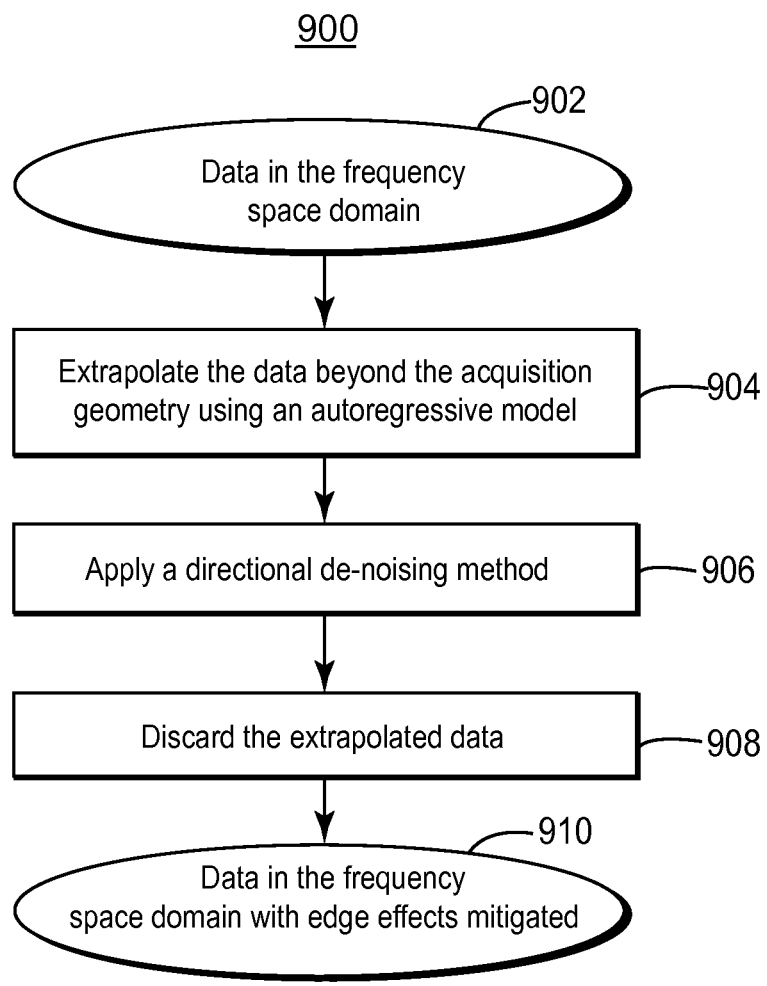
FIG. 11 illustrates a process for mitigating edge effects according to an embodiment.

According to an embodiment, to mitigate edge effects in connection with the filtering methods described above, the following method 900 shown in FIG. 11 can be applied. The method 900 includes using data in the frequency offset domain 902 by first using, as shown at step 904, autoregressive modeling to extrapolate the signal beyond the acquisition geometry in the frequency space domain to form an extrapolated signal. At step 906, in the data merged together with the extrapolated signal, a directional de-noising method, such as techniques described above, can be applied. Afterward, at step 908, the extrapolated portions of the signal are discarded which results in data in the frequency space domain with edge effects mitigated 910. This method for mitigating edge effects can be used in conjunction with the methods shown in FIGS. 6, 8 and 9 as desired.

According to an embodiment, the processes described with respect to FIGS. 6, 8 and 9 can be implemented in a moving window fashion and can also be run iteratively where filtered output data becomes the model data of the next iteration. According to another embodiment, for cases involving notch frequencies, when the model data and input data still contain sea surface source and receiver ghosts, the frequencies corresponding to the notch frequencies of either the model data or the input data can be processed with a different technique, e.g., processing the data with interpolation of the notch frequencies.

According to another embodiment, methods and systems described herein using model data and input data for performing directional de-noising can be used to perform directional de-noising on seismic data obtained in OBC acquisition activities, in marine seismic acquisition activities or in land seismic acquisition activities.

Figure 12:
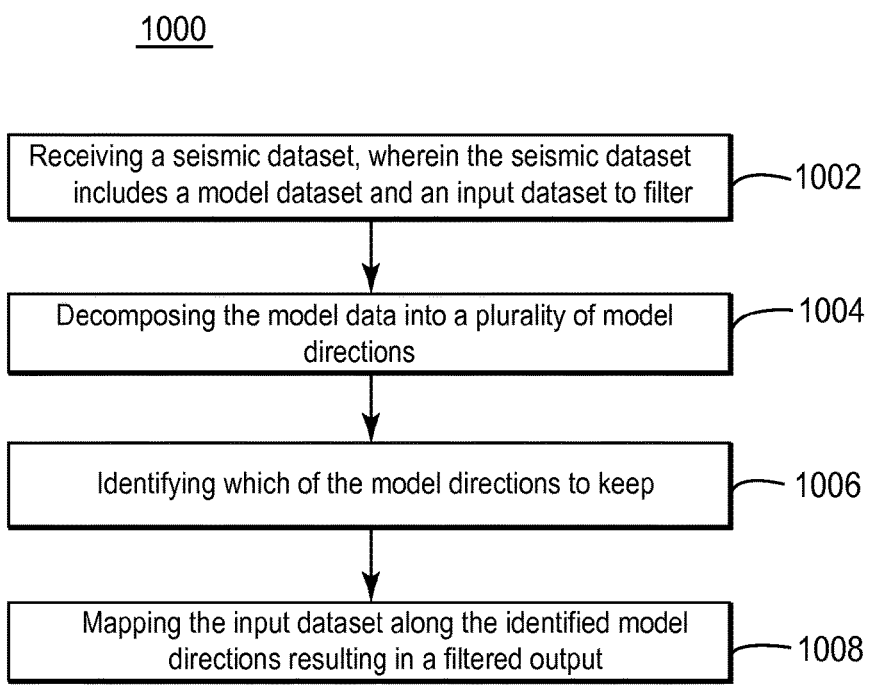
FIG. 12 shows a flowchart of a method for performing directional de-noising according to an embodiment.

Utilizing the above-described exemplary systems according to embodiments, a method 1000 for performing directional de-noising on seismic data recorded by seismic receivers is shown in the flowchart of FIG. 12. The method includes: at step 1002, receiving a seismic dataset, wherein the seismic dataset includes a model dataset and an input dataset to filter; at step 1004, decomposing the model dataset into a plurality of model directions; at step 1006, identifying which of the model directions to keep; and at step 1008, mapping the input dataset along the identified model directions resulting in a filtered output.

Figure 13:
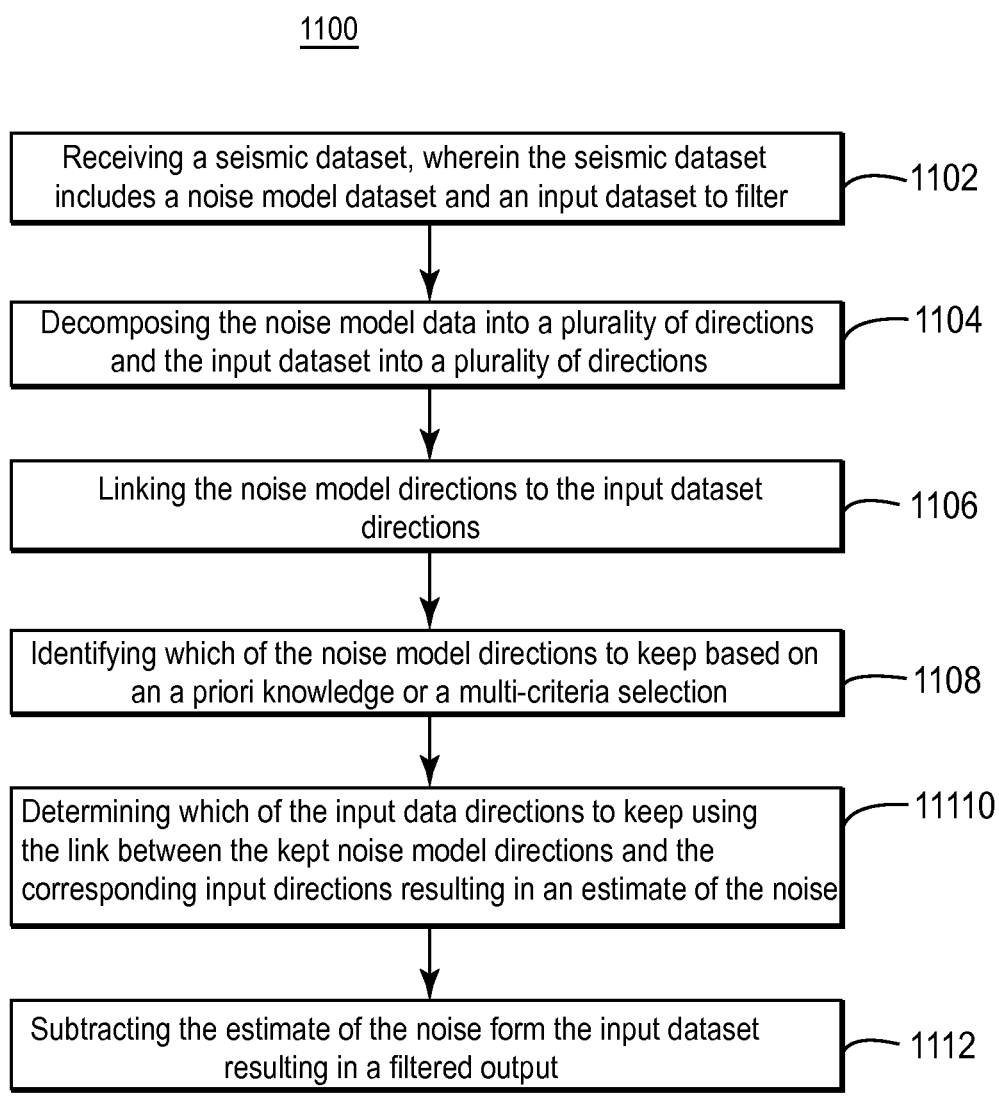
FIG. 13 shows another flowchart of a method for performing directional de-noising according to an embodiment.

Utilizing the above-described exemplary systems according to embodiments, another method for performing directional de-noising on seismic data recorded by seismic receivers is shown in the flowchart of FIG. 13. The method includes: at step 1102, receiving a seismic dataset, wherein the seismic dataset includes a noise model dataset and an input dataset to filter; at step 1104, decomposing the noise model data into a plurality of directions and the input dataset into a plurality of directions; at step 1106, linking the noise model directions to the input dataset directions; at step 1108, identifying which of the noise model directions to keep based on an a priori knowledge or a multi-criteria selection; at step 1110, determining which of the input data directions to keep using the link between the kept noise model directions and the corresponding input directions resulting in an estimate of the noise; and at step 1112, subtracting the estimate of the noise from the input dataset resulting in a filtered output.

Figure 14:
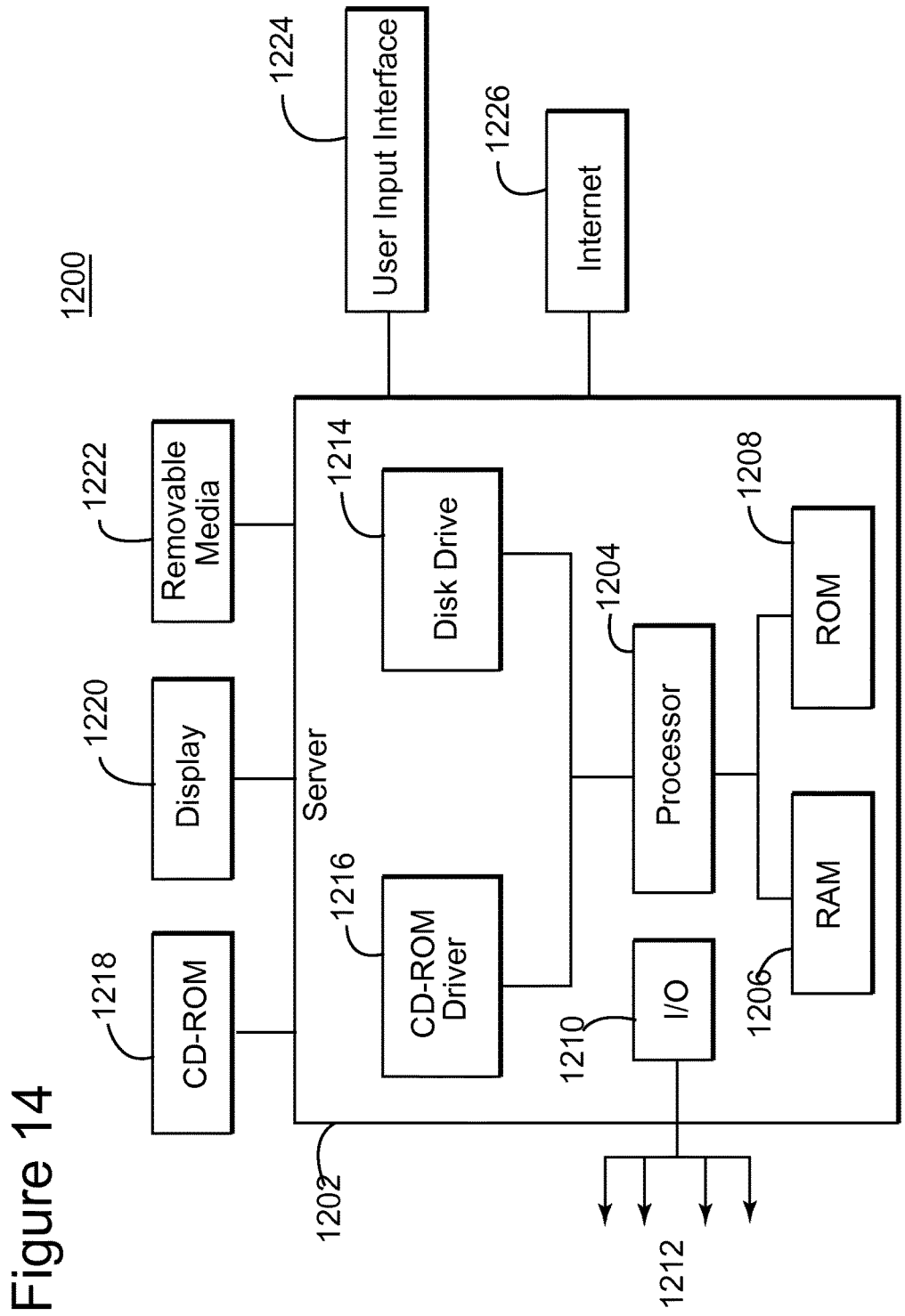
FIG. 14 shows a computing device according to an embodiment.

An example of a representative computer device 1200 capable of carrying out operations in accordance with the embodiments discussed above is illustrated in FIG. 14. Hardware, firmware, software or a combination thereof may be used to perform the various steps and operations described herein.

According to an embodiment, a computer device 1200 suitable for performing the activities described in the embodiments herein may include server 1202. Such a server 1202 may include a central processor unit (CPU) 1204 coupled to a random access memory (RAM) 1206 and to a read-only memory (ROM) 1208. The ROM 1208 may also be other types of storage media to store programs, such as programmable ROM (PROM), erasable PROM (EPROM), etc. The processor 1204 may communicate with other internal and external components through input/output (I/O) circuitry 1210 and bussing 1212, to provide control signals and the like. The processor 1204 carries out a variety of functions as are known in the art, as dictated by software and/or firmware instructions.

The server 1202 may also include one or more data storage devices, including hard disk drives 1214, CD-ROM drives 1216, and other hardware capable of reading and/or storing information such as a DVD, etc. In one embodiment, software for carrying out the above-discussed steps may be stored and distributed on a CD-ROM or DVD 1218, removable media 1222 or other form of media capable of portably storing information. These storage media may be inserted into, and read by, devices such as the CD-ROM drive 1216, the drive 1218, etc. The server 1202 may be coupled to a display 1220, which may be any type of known display or presentation screen, such as LCD or LED displays, plasma displays, cathode ray tubes (CRT), etc. A user input interface 1224 is provided, including one or more user interface mechanisms such as a mouse, keyboard, microphone, touch pad, touch screen, voice-recognition system, etc.

The server 1202 may be coupled to other computing devices via a network. The server may be part of a larger network configuration as in a global area network (GAN) such as the Internet 1226.

As also will be appreciated by one skilled in the art, the embodiments described herein may be embodied in a wireless communication device, a telecommunication network, as a method or in a computer program product. Accordingly, the embodiments may take the form of an entirely hardware embodiment or an embodiment combining hardware and software aspects. Further, the embodiments may take the form of a computer program product stored on a computer-readable storage medium having computer-readable instructions embodied in the medium. Any suitable computer readable medium may be utilized including hard disks, CD-ROMs, digital versatile discs (DVD), optical storage devices, or magnetic storage devices such a floppy disk or magnetic tape. Other non-limiting examples of computer readable media include flash-type memories or other known types of memories.

The disclosed embodiments provide an apparatus and a method for seismic data de-noising. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims. No element, act, or instruction used in the description of the present application should be construed as critical or essential to the invention unless explicitly described as such. Also, as used herein, the article "a" is intended to include one or more items.

What is claimed is:

1. A method for performing directional de-noising on seismic data recorded by seismic receivers detecting seismic waves emerging from a geophysical structure, the method comprising:
   receiving a seismic dataset, wherein the seismic dataset includes a model dataset and an input dataset to filter;
   decomposing the model dataset into a plurality of model directions;
   identifying which of the model directions to keep;
   mapping the input dataset along the identified model directions resulting in a filtered output; and
   generating an image of the geophysical structure based on the filtered output, for assessing presence of oil and/or gas reservoirs.

2. The method of claim 1, further comprising:
   mapping a model data frequency slice into a Hankel matrix; and applying a rank reduction method that extracts signal directions.

3. The method of claim 2, wherein the applying of the rank reduction method includes using one of truncated singular value decomposition, robust rank reduction filtering, eigenimage analysis, or some combination thereof.

4. The method of claim 1, further comprising:
   mapping an input data frequency slice into a Hankel matrix; and
   estimating input data phases and amplitudes using least squares fitting along model data directions.

5. The method of claim 1, wherein the input dataset is one of land seismic data, marine towed streamer seismic data or Ocean Bottom Cable (OBC) seismic data.

6. The method of claim 1, wherein the model dataset includes one of
   another component dataset, a synthetic dataset, a strongly de-noised dataset or a dataset resulting from previously processed data.

7. A method for performing directional de-noising on seismic data recorded by seismic receivers detecting seismic waves emerging from a geophysical structure, the method comprising:
   receiving a seismic dataset, wherein the seismic dataset includes a model dataset and an input dataset to filter;
   merging the model dataset and the input dataset into a single dataset;
   mapping each frequency slice into a Hankel matrix of Hankel matrices;
   reducing the rank of the Hankel matrix;
   recovering the structure of a Hankel matrix;
   extracting the filtered frequency slice;
   separating the input dataset from the model dataset resulting in a filtered output; and
   generating an image of the geophysical structure based on the filtered output, for assessing presence of oil and/or gas reservoirs.

8. The method of claim 7, wherein
   the input dataset includes at least one dataset.

9. The method of claim 7, wherein the applying of the rank reduction method includes using one of truncated singular value decomposition, robust rank reduction filtering, eigenimage analysis, or some combination thereof.

10. The method of claim 7, wherein the input dataset is one of land seismic data, marine towed streamer seismic data or Ocean Bottom Cable (OBC) seismic data.

11. The method of claim 7, wherein the model dataset includes one of another component dataset, a synthetic dataset, a strongly de-noised dataset or a dataset resulting from previously processed data.

12. A computer device for performing directional de-noising on seismic data recorded by seismic receivers detecting seismic waves emerging from a geophysical structure, the device comprising:
   the computer device configured to receive a seismic dataset, wherein the seismic dataset includes a model dataset and an input dataset to filter;

a processor configured
to decompose the model dataset into a plurality of model directions,
to identify which of the model directions to keep,
to map the input dataset along the identified model directions resulting in a filtered output, and
to generate an image of the geophysical structure based on the filtered output, for assessing presence of oil and/or gas reservoirs.

13. The computer device of claim 12, wherein the processor is further configured to map a model data frequency slice into a Hankel matrix, and to apply a rank reduction method that extracts signal directions.

14. The computer device of claim 12, wherein applying the rank reduction method includes using one of truncated singular value decomposition, robust rank reduction filtering, eigenimage analysis, or some combination thereof.

15. The computer device of claim 12, wherein the processor is further configured to map an input data frequency slice into a Hankel matrix, and to estimate input data phases and amplitudes using least squares fitting along model data directions.

16. The computer device of claim 12, wherein the input dataset is one of land seismic data, marine towed streamer seismic data or Ocean Bottom Cable (OBC) seismic data.

17. The computer device of claim 12, wherein the model dataset includes one of another component dataset, a synthetic dataset, a strongly de-noised dataset or a dataset resulting from previously processed data.

* * * * *